US012183351B2

(12) United States Patent
Breebaart et al.

(10) Patent No.: US 12,183,351 B2
(45) Date of Patent: Dec. 31, 2024

(54) AUDIO ENCODING/DECODING WITH TRANSFORM PARAMETERS

(71) Applicant: Dolby Laboratories Licensing Corporation, San Francisco, CA (US)

(72) Inventors: Dirk Jeroen Breebaart, Ultimo (AU); Alex Brandmeyer, Berkeley, CA (US); Poppy Anne Carrie Crum, Oakland, CA (US); McGregor Steele Joyner, ALameda, CA (US); David Mcgrath, Rose Bay (AU); Andrea Fanelli, Oakland, CA (US); Rhonda J. Wilson, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 137 days.

(21) Appl. No.: 17/762,709

(22) PCT Filed: Sep. 22, 2020

(86) PCT No.: PCT/US2020/052056
§ 371 (c)(1),
(2) Date: Mar. 22, 2022

(87) PCT Pub. No.: WO2021/061675
PCT Pub. Date: Apr. 1, 2021

(65) Prior Publication Data

US 2022/0366919 A1 Nov. 17, 2022

Related U.S. Application Data

(60) Provisional application No. 63/033,367, filed on Jun. 2, 2020, provisional application No. 62/904,070, filed on Sep. 23, 2019.

(51) Int. Cl.
*H04S 7/00* (2006.01)
*G10L 19/008* (2013.01)

(52) U.S. Cl.
CPC ............ *G10L 19/008* (2013.01); *H04S 7/306* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 5,371,799 | A | 12/1994 | Lowe |
| 6,795,556 | B1 | 9/2004 | Sibbald |

(Continued)

FOREIGN PATENT DOCUMENTS

| | | |
|---|---|---|
| CN | 1369189 | 9/2002 |
| CN | 101202043 | 6/2008 |

(Continued)

OTHER PUBLICATIONS

Digital Audio Compression (AC-4) Standard Part 2: Immersive and personalized audio; ETSI TS 103 190-2, ETSI Draft; ETSI TS 103 190-2, European Telecommunications Standards Institute (ETSI), 650, Route Des Lucioles ; F-06921 Sophia-Antipolis; France, vol. Broadcast, No. V1.1.0, Jul. 10, 2015 (Jul. 10, 2015), pp. 1-195.

(Continued)

*Primary Examiner* — James K Mooney

(57) ABSTRACT

Encoding/decoding techniques where multiple transform parameter sets are encoded together with a rendered playback presentation of an input audio content. The multiple transform parameters are used on the decoder side to transform the playback presentation to provide a personalized binaural playback presentation optimized for an individual listener with respect to their hearing profile. This may be achieved by selection or combination of the data present in the metadata streams.

27 Claims, 3 Drawing Sheets

(56) References Cited

U.S. PATENT DOCUMENTS

| | | | |
|---|---|---|---|
| 7,840,019 B2 | 11/2010 | Slaney | |
| 7,876,904 B2 | 1/2011 | Ojala | |
| 7,936,887 B2 | 5/2011 | Smyth | |
| 8,027,476 B2 | 9/2011 | Miura | |
| 8,175,280 B2 | 5/2012 | Lars | |
| 8,234,122 B2 | 7/2012 | Kim | |
| 8,265,284 B2 | 9/2012 | Falck | |
| 8,654,983 B2 | 2/2014 | Breebaart | |
| 8,682,679 B2 | 3/2014 | Breebaart | |
| 8,687,829 B2 | 4/2014 | Hilpert | |
| 8,908,874 B2 | 12/2014 | Johnston | |
| 8,965,000 B2 | 2/2015 | Engdegard | |
| 9,131,305 B2 | 9/2015 | Li | |
| 9,173,032 B2 | 10/2015 | Brungart | |
| 9,426,599 B2 | 8/2016 | Walsh | |
| 9,729,985 B2 | 8/2017 | Lin | |
| 9,936,326 B2 | 4/2018 | Yamashita | |
| 9,980,072 B2 | 5/2018 | Lyren | |
| 9,980,077 B2 | 5/2018 | Lee | |
| 10,080,093 B2 | 9/2018 | Lyren | |
| 10,142,761 B2 | 11/2018 | Brown | |
| 10,165,381 B2 | 12/2018 | Baek | |
| 10,255,027 B2 | 4/2019 | Tsingos | |
| 2005/0190925 A1 | 9/2005 | Miura | |
| 2006/0045294 A1 | 3/2006 | Smyth | |
| 2007/0160218 A1 | 7/2007 | Jakka | |
| 2008/0181432 A1 | 7/2008 | Jeong | |
| 2008/0273708 A1 | 11/2008 | Sandgren | |
| 2008/0281602 A1 | 11/2008 | Van Schijndel | |
| 2009/0012796 A1 | 1/2009 | Jung | |
| 2009/0043591 A1 | 2/2009 | Breebaart | |
| 2010/0246832 A1 | 9/2010 | Villemoes | |
| 2011/0123031 A1 | 5/2011 | Ojala | |
| 2011/0135098 A1 | 6/2011 | Kuhr | |
| 2011/0264456 A1 | 10/2011 | Koppens | |
| 2012/0201389 A1 | 8/2012 | Emerit | |
| 2012/0259643 A1 | 10/2012 | Engdegard | |
| 2012/0314876 A1 | 12/2012 | Vilkamo | |
| 2013/0243200 A1 | 9/2013 | Horbach | |
| 2013/0272527 A1 | 10/2013 | Oomen | |
| 2014/0119551 A1 | 5/2014 | Bharitkar | |
| 2014/0153727 A1 | 6/2014 | Walsh | |
| 2014/0355794 A1 | 12/2014 | Morrell | |
| 2014/0355795 A1 | 12/2014 | Xiang | |
| 2015/0010160 A1* | 1/2015 | Udesen | H04R 25/70 381/60 |
| 2015/0097759 A1 | 4/2015 | Evans | |
| 2016/0037279 A1 | 2/2016 | Borne | |
| 2017/0339504 A1 | 11/2017 | Bharitkar | |
| 2018/0035233 A1 | 2/2018 | Fielder | |
| 2018/0233156 A1 | 8/2018 | Breebaart | |
| 2018/0324542 A1 | 11/2018 | Seo | |
| 2018/0359596 A1 | 12/2018 | Breebaart | |
| 2019/0035410 A1 | 1/2019 | Breebaart | |
| 2019/0191263 A1 | 6/2019 | Lyren | |
| 2020/0227052 A1 | 7/2020 | Breebaart | |

FOREIGN PATENT DOCUMENTS

| | | | |
|---|---|---|---|
| CN | 101529501 | | 9/2009 |
| CN | 101933344 | | 12/2010 |
| CN | 102792588 | B | 11/2012 |
| CN | 104471641 | | 3/2015 |
| CN | 104620607 | B | 5/2015 |
| CN | 106231528 | B | 11/2017 |
| CN | 108353242 | A | 10/2020 |
| CN | 108141685 | A | 3/2021 |
| EP | 2146522 | A1 | 1/2010 |
| EP | 3509327 | A1 | 10/2020 |
| JP | 2007221483 | | 8/2007 |
| JP | 2009527970 | A | 7/2009 |
| JP | 2018502535 | A | 1/2018 |
| JP | 2018529121 | A | 10/2018 |
| WO | 2012033950 | A1 | 3/2012 |
| WO | 2014036085 | A1 | 3/2014 |
| WO | 2014036121 | A1 | 3/2014 |
| WO | 2014046923 | A1 | 3/2014 |
| WO | 2014091375 | A1 | 6/2014 |
| WO | 2014111765 | A1 | 7/2014 |
| WO | 2014111829 | A1 | 7/2014 |
| WO | 2015010983 | A1 | 1/2015 |
| WO | 2015011055 | A1 | 1/2015 |
| WO | 2017035281 | A2 | 3/2017 |
| WO | 2018132417 | A1 | 7/2018 |

OTHER PUBLICATIONS

Algazi, V.R., Duda, R.O, Thompson, D.M., Avendano, C. (2001). The CIPIC HRTF database. Proceedings of the 2001 IEEE Workshop on the Applications of Signal Processing to Audio and Acoustics.

Anonymous: "Dolby AC-4: Audio Delivery for Next-generation Entertainment Services", Jun. 1, 2015 (Jun. 1, 2015).

Blauert, J. (1997). Spatial hearing: the psychophysics of human sound localization. MIT Press.

Chen, et al. "Autoencoding HRTFS for DNN Based HRTF Personalization Using Anthropometric Features" Published in: ICASSP 2019—2019 IEEE International Conference on Acoustics, Speech and Signal Processing (ICASSP) Publisher: IEEE, Dec. 31, 2018.

Dolby AC-4 Audio System. https://www.dolby.com/us/en/technologies/AC-4.html.

Gupta, N., Barreto, A., Choudhury, M. (2004). Modeling head-related transfer functions based on pinna anthropometry. Proc. of the Second International Latin American and Caribbean Conference for Engineering and Technology.

J Breebaart et al: "Binaural Cues for Multiple Sound Sources" In: "Spatial Audio Processing: MPEG Surround and Other Applications", Jan. 1, 2007 (Jan. 1, 2007), John Wiley & Sons, pp. 139-154.

Kim, Kwangki. "Binaural decoding for efficient multi-channel audio service in network environment" Consumer Communications and Networking Conference (CCNC), 2014 IEEE 11th (2014): 525-526.

Kistler et al: 11A Model of Head-Related Transfer Functions Based on Principal Components Analysis and Minimum-Phase Reconstruction 11, The Journal of the Acoustical Society of America, American Institute of Physics for the Acoustical Society of America, New York, NY, US, vol. 91, No. 3, Mar. 1, 1992 (Mar. 1, 1992), pp. 1637-1647.

Klepko, John. "5-channel microphone array with binaural-head for multichannel reproduction" ProQuest document (1999): 185; DAI-A 61/12, p. 4608.

McFadden, D., Jeffress, L.A., Russell, W.E. (1974). Individual Differences in Sensitivity to Interaural Differences in Time and Level. Perceptual and Motor Skills, 37(3), 755-761.

Parham Mokhtari et al: 11 Further observations on a principal components analysis of head-related transfer functions 11, Scientific Reports, vol. 9, No. 1, May 16, 2019 (May 16, 2019).

Paulus Jouni et al: "MPEG-D Spatial Audio Object Coding for Dialogue Enhancement (SAOC-DE)", AES Convention 138; May 2015, AES, 60 East 42ND Street, Room 2520 New York 10165-2520, USA, May 6, 2015 (May 6, 2015), pp. 10-20.

Pelzer, Sonke. "Integrating Real-Time Room Acoustics Simulation into a CAD Modeling Software to Enhance the Architectural Design Process" Buildings (2014): 2, 113-138.

Pulkki, et al. "Overview of Time-Frequency Domain Parametric Spatial Audio Techniques" Dec. 31, 2018, pp. 416 Copyright Year: 2018 Edition: 1 Wiley-IEEE Press.

Ramona Bomhardt et al: 11 Individualization of head-related transfer functions using principal component analysis and anthropometric dimensions 11, Proceedings of Meetings on Acoustics, vol. 29, Dec. 2, 2016 (Dec. 2, 2016).

Stewart, Rebecca. "Spatial Auditory Display for Acoustics and Music Collections" A dissertation submitted in partial fulfillment of the requirements for the degree of Doctor of Philosophy of the University of London. School of Electronic Engineering and Computer Science Queen Mary, University of London (2010).

(56) References Cited

OTHER PUBLICATIONS

Talagala, D.S. "Binaural localization of speech sources in the median plane using cepstral hrtf extraction" Signal Processing Conference (EUSIPCO), Proceedings of the 22nd European (2014): 2055-2059.

Vercoe, B.L. ; Gardner, W.G. ; Scheirer, E.D. "Structured audio: creation, transmission, and rendering of parametric sound representations" Proceedings of the IEEE vol. 86, Issue: 5 (1998): 922-940.

Wightman, F. L., and Kistler, D. J. (1989b). "Headphone simulation of free-field listening. I. Stimulus synthesis," J. Acoust. Soc. Am. 85, 858-867.

Zhang, M. et al."Modeling of Individual HRTF's Based on Spatial Principal Component Analysis" Jan. 17, 2020, pp. 785-797.

Riedmiller, J. et al."Immersive & Personalized Audio: a Practical System for Enabling Interchange, Distribution & Delivery of Next Generation Audio Experiences" SMPTE Annual Technical Conference & Exhibition, Oct. 20-23, 2014, pp. 1-23.

Robinson, C. Q. "Scalable Format and Tools to Extend the Possibilities of Cinema Audio" SMPTE Meeting Presentation, pp. 63-69, 2012.

* cited by examiner

AUDIO ENCODING/DECODING WITH TRANSFORM PARAMETERS

CROSS-REFERENCE TO RELATED APPLICATIONS

This application claims priority to U.S. Provisional Patent Application No. 62/904,070, filed 23 Sep. 2019 and U.S. Provisional Patent Application No. 63/033,367, filed 2 Jun. 2020, which are incorporated herein by reference.

FIELD OF THE INVENTION

The present invention relates to encoding and decoding of audio content having one or more audio components.

BACKGROUND OF THE INVENTION

Immersive entertainment content typically employs channel- or object-based formats for creation, coding, distribution and reproduction of audio across target playback systems such as cinematic theaters, home audio systems and headphones. Both channel—and object based formats employ different rendering strategies, such as downmixing, in order to optimize playback for the target system in which the audio is being reproduced.

In the case of headphone playback, one potential rendering solution, illustrated in FIG. 1, involves the use of head-related impulse responses (HRIRs, time domain) or head-related transfer functions (HRTFs, frequency domain) to simulate a multichannel speaker playback system. HRIRs and HRTFs simulate various aspects of the acoustic environment as sound propagates from the speaker to the listener's eardrum. Specifically, these responses introduce specific cues, including interaural time differences (ITDs), interaural level differences (ILDs) and spectral cues that inform a listener's perception of the spatial location of sounds in the environment. Additional simulation of reverberation cues can inform the perceived distance of a sound relative to the listener and provide information about the specific physical characteristics of a room or other environment. The resulting two-channel signal is referred to as a binaural playback presentation of the audio content.

However, this approach presents some challenges. Firstly, the delivery of immersive content formats (high-channel count or object-based) over a data network is associated with increased bandwidth for transmission and the relevant costs/technical limitations of this delivery. Secondly, leveraging HRIRs/HRTFs on a playback device requires that signal processing is applied for each channel or object in the delivered content. This implies that the complexity of rendering grows linearly with each delivered channel/object. As mobile devices with limited processing power and battery life are often the devices used for headphone audio playback, such a rendering scenario would shorten battery life and limit processing available for other applications (i.e. graphic/video rendering).

One solution to reduce device side demands is to perform the convolution with HRIRs/HRTFs prior to transmission ('binaural pre-rendering'), reducing both the computational complexity of audio rendering on device as well as the overall bandwidth required for transmission (i.e. delivering two audio channels in place of a higher channel or object count). Binaural pre-rendering, however, is associated with an additional constraint: the various spatial cues introduced into the content (ITDs, ILDs and spectral cues) will also be present when playing back audio on loudspeakers, effectively leading to these cues being applied twice, introducing undesired artifacts into the final audio reproduction.

Document WO 2017/035281 discloses a method that uses metadata in the form of transform parameters to transform a first signal representation into a second signal representation, when the reproduction system does not match the specified layout envisioned during content creation/encoding. A specific example of the application of this method is to encode audio as a signal presentation intended for a stereo loudspeaker pair, and to include metadata (parameters) which allows this signal presentation to be transformed into a signal presentation intended for headphone playback. In this case the metadata will introduce the spatial cues arising from the HRIR/BRIR convolution process. With this approach, the playback device will have access to two different signal presentations at relatively low cost (bandwidth and processing power).

GENERAL DISCLOSURE OF THE INVENTION

Although representing a significant improvement, the approach in WO 2017/035281 has some shortcomings. For example, the ITD, ILD and spectral cues that represent the human ability to perceive the spatial location of sounds differ across individuals, due to differences in individual physical traits. Specifically, the size and shape of the ears, head and torso will determine the nature of the cues, all of which can differ substantially across individuals. Each individual has learned over time to optimally leverage the specific cues that arise from their body's interaction with the acoustic environment for the purposes of spatial hearing. Therefore, the presentation transform provided by the metadata parameters may not lead to optimal audio reproduction over headphones for a significant number of individuals, as the spatial cues introduced during the decoding process by the transform will not match their naturally occurring interactions with the acoustic environment.

It would be desirable to provide a satisfactory solution for providing improved individualization of signal presentations in a playback device in a cost-efficient manner.

It is therefore an objective of the present invention to provide improved personalization of a signal presentation in a playback device. A further objective is to optimize reproduction quality and efficiency, and to preserve creative intent for channel- and object-based spatial audio content during headphone playback.

According to a first aspect of the present invention, this and other objectives is achieved by a method of encoding an input audio content having one or more audio components, wherein each audio component is associated with a spatial location, the method including the steps of rendering an audio playback presentation of the input audio content, the audio playback presentation intended for reproduction on an audio reproduction system, determining a set of M binaural representations by applying M sets of transfer functions to the input audio content, wherein the M sets of transfer functions are based on a collection of individual binaural playback profiles, computing M sets of transform parameters enabling a transform from the audio playback presentation to M approximations of the M binaural representations, wherein the M sets of transform parameters are determined by optimizing a difference between the M binaural representations and the M approximations, and encoding the audio playback presentation and the M sets of transform parameters for transmission to a decoder.

According to a second aspect of the present invention, this and other objectives is achieved by a method of decoding a personalized binaural playback presentation from an audio bitstream, the method including the steps of receiving and decoding an audio playback presentation, the audio playback presentation intended for reproduction on an audio reproduction system, receiving and decoding M sets of transform parameters enabling a transform from the audio playback presentation to M approximations of M binaural representations, wherein the M sets of transform parameters have been determined by an encoder to minimize a difference between the M binaural representations and the M approximations generated by application of the transform parameters to the audio playback presentation, combining the M sets of transform parameters into a personalized set of transform parameters; and applying the personalized set of transform parameters to the audio playback presentation, to generate the personalized binaural playback presentation.

According to a third aspect of the present invention, this and other objectives is achieved by an encoder for encoding an input audio content having one or more audio components, wherein each audio component is associated with a spatial location, the encoder comprising a first renderer for rendering an audio playback presentation of the input audio content, the audio playback presentation intended for reproduction on an audio reproduction system, a second renderer for determining a set of M binaural representations by applying M sets of transfer functions to the input audio content, wherein the M sets of transfer functions are based on a collection of individual binaural playback profiles, a parameter estimation module for computing M sets of transform parameters enabling a transform from the audio playback presentation to M approximations of the M binaural representations, wherein the M sets of transform parameters are determined by optimizing a difference between the M binaural representations and the M approximations, and an encoding module for encoding the audio playback presentation and the M sets of transform parameters for transmission to a decoder.

According to a fourth aspect of the present invention, this and other objectives is achieved by a decoder for decoding a personalized binaural playback presentation from an audio bitstream, the decoder comprising a decoding module for receiving the audio bitstream and decoding an audio playback presentation intended for reproduction on an audio reproduction system and M sets of transform parameters enabling a transform from the audio playback presentation to M approximations of M binaural representations, wherein the M sets of transform parameters have been determined by an encoder to minimize a difference between the M binaural representations and the M approximations generated by application of the transform parameters to the audio playback presentation, a processing module for combining the M sets of transform parameters into a personalized set of transform parameters, and a presentation transformation module for applying the personalized set of transform parameters to the audio playback presentation, to generate the personalized binaural playback presentation.

According to some aspects of the invention, on the encoder side, multiple transform parameter sets (multiple metadata streams) are encoded together with a rendered playback presentation of the input audio. The multiple metadata streams represent distinct sets of transform parameters, or rendering coefficients, that are derived by determining a set of binaural representations of the input immersive audio content using multiple (individual) hearing profiles, device transfer functions, HRTFs or profiles representative of differences in HRTFs between individuals, and then calculating the required transform parameters to approximate the representations starting from the playback presentation.

According to some aspects of the invention, on the decoder (playback) side, the transform parameters are used to transform the playback presentation to provide a binaural playback presentation optimized for an individual listener with respect to their hearing profile, chosen headphone device and/or listener-specific spatial cues (ITDs, ILDs, spectral cues). This may be achieved by selection or combination of the data present in the metadata streams. More specifically, a personalized presentation is obtained by application of a user-specific selection or combination rule.

The concept of using transform parameters to allow approximation of a binaural playback presentation from an encoded playback presentation is not novel per se, and is discussed in some detail in WO 2017/035281, hereby incorporated by reference.

With embodiments of the present invention, multiple such transform parameter sets are employed to allow personalization. The personalized binaural presentation can subsequently be produced for a given user with respect to matching a given user's hearing profile, playback device and/or HRTF as closely as possible.

The invention is based on the realization that a binaural presentation, to a larger extent than conventional playback presentations, benefits from personalization, and that the concept of transform parameters provides a cost efficient approach to providing such personalization.

BRIEF DESCRIPTION OF THE DRAWINGS

The present invention will be described in more detail with reference to the appended drawings, showing currently preferred embodiments of the invention.

DETAILED DESCRIPTION OF EMBODIMENTS OF THE INVENTION

Figure 1:
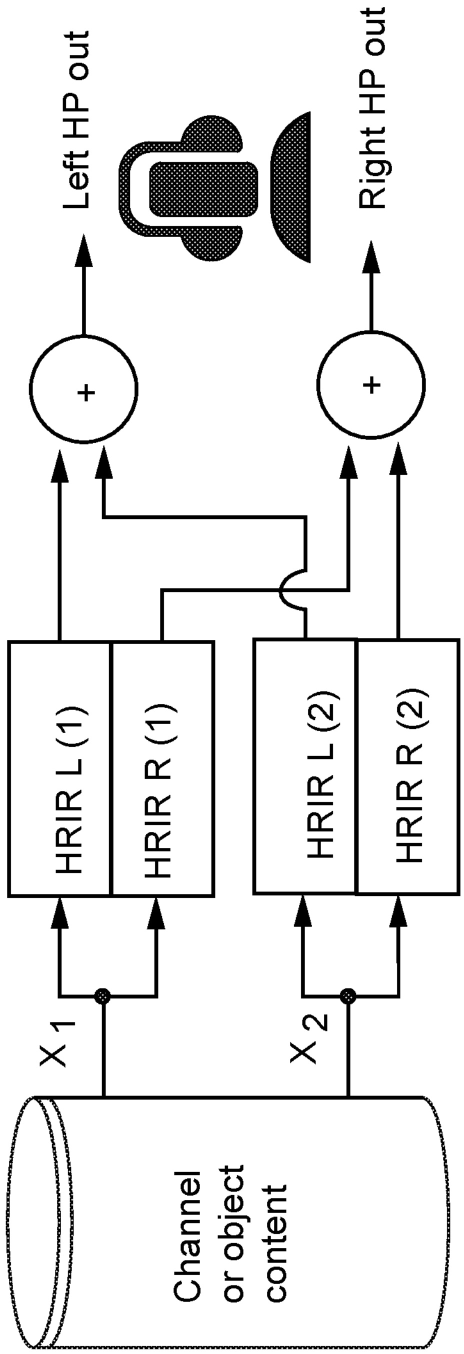
FIG. 1 illustrates rendering of audio data into a binaural playback presentation.

Systems and methods disclosed in the following may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The herein disclosed embodiments provide methods for a low bit rate, low complexity encoding/decoding of channel and/or object based audio that is suitable for stereo or headphone (binaural) playback. This is achieved by (1) rendering an audio playback presentation intended for a specific audio reproduction system (for example, but not limited to loudspeakers), and (2) adding additional metadata that allow transformation of that audio playback presentation into a set of binaural presentations intended for reproduction on headphones. Binaural presentations are by definition two-channel presentations (intended for headphones), while the audio playback presentation in principle may have any number of channels (e.g. two for a stereo loudspeaker presentation, or five for a 5.1 loudspeaker presentation). However, in the following description of specific embodiment, the audio playback presentation is always a two-channel presentation (stereo or binaural).

In the following disclosure, the expression "binaural representation" is also used for a signal pair which represents binaural information, but is not necessarily, in itself, intended for playback. For example, in some embodiments, a binaural presentation may be achieved by a combination of binaural representations, or by combining a binaural presentation with binaural representations.

Figure 2:
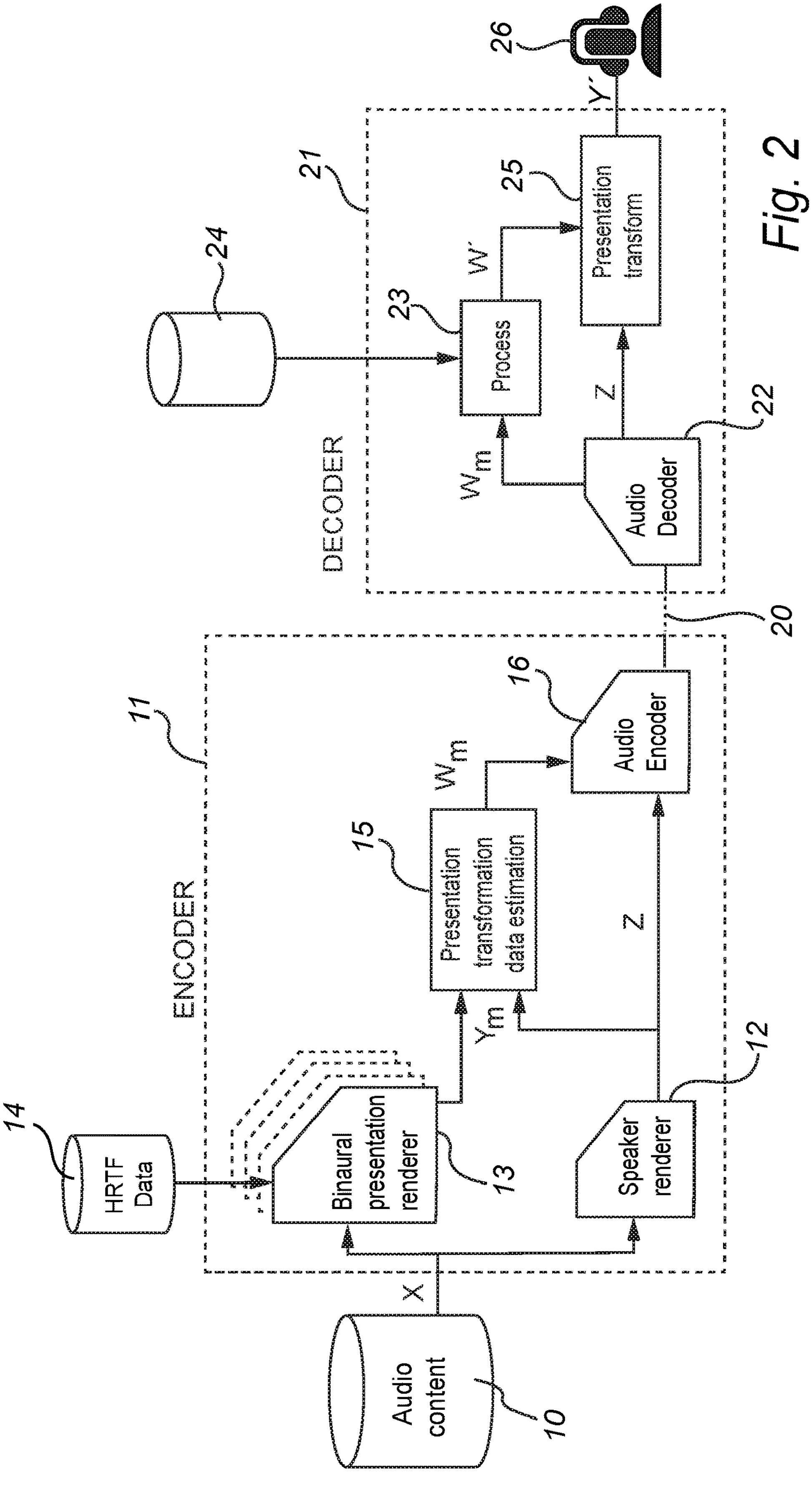
FIG. 2 schematically shows an encoder/decoder system according to an embodiment of the present invention.

Loudspeaker-Compatible Delivery of Binaural Audio with Individual Optimization In a first embodiment, illustrated in FIG. 2, an encoder 11 includes a first rendering module 12 for rendering multi-channel or object-based (immersive) audio content 10 into a playback presentation Z, here a two-channel (stereo) presentation intended for playback on two loudspeakers. The encoder 11 further includes a second rendering module 13 for rendering the audio content into a set of M binaural presentations $Y_m$ (m=1, . . . , M) using HRTFs (or data derived thereof) stored in a database 14. The encoder further comprises a parameter estimation module 15, connected to receive the playback presentation Z and the set of M binaural presentations $Y_m$, and configured to calculate a set of presentation transformation parameters $W_m$ for each of the binaural presentations $Y_m$. The presentation transformation parameters $W_m$ allow an approximation of the M binaural presentations from the loudspeaker presentation Z. Finally, the encoder 11 includes the actual encoding module 16, which combines the playback presentation Z and the parameter sets $W_m$ into an encoded bitstream 20.

FIG. 2 further illustrates a decoder 21, including a decoding module 22 for decoding the bitstream 20 into the playback presentation Z and the M parameter sets $W_m$. The encoder further comprises a processing module 23 which receives the m sets of transform parameters, and is configured to output one single set of transform parameters W', which is a selection or combination of the M parameter sets $W_m$. The selection or combination performed by the processing module 23 is configured to optimize the resulting binaural presentation Y' for the current listener. It may be based on a previously stored user profile 24 or be a user-controlled process.

A presentation transformation module 25 is configured to apply the transform parameters W' to the audio presentation Z, to provide an estimated (personalized) binaural presentation Y'.

The processing in the encoder/decoder in FIG. 2 will now be discussed in more detail.

Given a set of input channels or objects $x_i[n]$ with discrete-time sample index n, the corresponding playback presentation Z, which here is a set of loudspeaker channels, is generated in the renderer 12 by means of amplitude panning gains $g_{s,i}$ that represent the gain of object/channel i to speaker s:

$$z_s[n] = \sum_i g_{s,i} x_i[n]$$

Depending on whether or not the input content is channel- or object-based, the amplitude panning gains $g_{s,i}$ are either constant (channel-based) or time-varying (object-based, as a function of the associated time-varying location metadata).

In parallel, the headphone presentation signal pairs $Y_m=\{Y_{l,m}, Y_{r,m}\}$ are rendered in the renderer 13 using a pair of filters $h_{\{l,r\},m,i}$ for each input i and for each presentation m:

$$y_{l,m} = \sum_i x_i[n] \circ h_{l,m,i}[n]$$

$$y_{r,m} = \sum_i x_i[n] \circ h_{r,m,i}[n]$$

where (°) is the convolution operator. The pair of filters $h_{\{l,r\},m,i}$ for each input i and presentation m is derived from M HRTF sets $h_{\{l,r\},m}(\alpha,\theta)$ which describe the acoustical transfer function (head related transfer function, HRTF) from a sound source location given by an azimuth angle (α) and elevation angle (θ) to both ears for each presentation m. As one example, the various presentations m might refer to individual listeners, and the HRTF sets reflect differences in anthropometric properties of each listener. For convenience a frame of N time-consecutive samples of a presentation is denoted as follows:

$$Y_m = \begin{bmatrix} y_{l,m}[0] & \ldots & y_{r,m}[0] \\ \vdots & & \vdots \\ y_{l,m}[N-1] & \ldots & y_{r,m}[N-1] \end{bmatrix}$$

As described in WO 2017/035281, the estimation module 15 calculates the presentation transformation data $W_m$ for presentation m by minimizing the root-mean-square error (RMSE) between the presentation $Y_m$ and its estimate $\hat{Y}_m$:

$$\hat{Y}_m = ZW_m$$

which gives $$W_m = (Z^*Z + \epsilon I)^{-1} Z^* Y_m$$

with (*) the complex conjugate transposition operator, and epsilon a regularization parameter. The presentation transformation data $W_m$ for each presentation m are encoded together with the playback presentation Z by the encoding module 16 to form the encoder output bitstream °.

On the decoder side, the decoding module 22 decodes the bit stream 20 into a playback presentation Z as well as the presentation transformation data $W_m$. The processing block 23 uses or combines all or a subset of the presentation transformation data $W_m$ to provide a personalized presentation transform W', based on user input or a previously stored user profile 24. The approximated personalized output binaural presentation Y' is then given by:

$$Y'=ZW'$$

In one example, the processing in block 23 is simply a selection of one of the M parameter sets $W_m$. However, the personalized presentation transform W' can alternatively be formulated as a weighted linear combination of the M sets of presentation transformation coefficients $W_m$.

$$W' = \sum_m a_m W_m$$

with weights $a_m$ being different for at least two listeners.

The personalized presentation transform W' is applied in module 25 to the decoded playback presentation Z, to provide the estimated personalized binaural presentation Y'.

The transformation may be an application of a linear gain N=2 matrix, where N is the number of channels in the audio playback presentation, and where the elements of the matrix are formed by the transform parameters. In the present case, where the transformation is from a two-channel loudspeaker presentation to a two-channel binaural presentation, the matrix will be a 2×2 matrix.

The personalized binaural presentation Y' may be outputted to a set of headphones 26.

Individual Presentations with Support for a Default Binaural Presentation

If no loudspeaker-compatible presentation is required, the playback presentation may be a binaural presentation instead of a loudspeaker presentation. This binaural presentation may be rendered with default HRTFs, e.g. with HRTFs that are intended to provide a one-size-fits-all solution for all listeners. An example of default HRTFs $\bar{h}_{l,i}, \bar{h}_{r,i}$ are those measured or derived from a dummy head or mannequin. Another example of a default HRTF set is a set that was averaged across sets from individual listeners. In that case, the signal pair Z is given by:

$$z_l = \sum_i x_i[n] \circ \bar{h}_{l,i}[n]$$

$$z_r = \sum_i x_i[n] \circ \bar{h}_{r,i}[n]$$

Embodiment Based on Canonical HRTF Sets

In another embodiment, the HRTFs used to create the multiple binaural presentations are chosen such that they cover a wide range of anthropometric variability. In that case the HRTFs used in the encoder can be referred to as canonical HRTF sets as a combination of one or more of these HRTF sets can describe any existing HRTF set across a wide population of listeners. The number of canonical HRTFs may vary across frequency. The canonical HRTF sets may be determined by clustering HRTF sets, identifying outliers, multivariate density estimates, using extremes in anthropometric attributes such as head diameter and pinna size, and alike.

A bitstream generated using canonical HRTFs requires a selection or combination rule to decode and reproduce a personalized presentation. If the HRTFs for a specific listener are known, and given by $h'_{\{l,r\},i}$ for the left (l) and right (r) ears and direction i, one could for example choose to use the canonical HRTF set m'for decoding that is most similar to the listener's HRTF set based on some distance criterion, for example:

$$m' = \operatorname{argmin}\left(\sum_{i,\{l,r\}} \left(h'_{\{l,r\},i} - h_{\{l,r\},m,i}\right)^2\right)$$

Alternatively one could compute a weighted average using weights $a_m$ across canonical HRTFs based on a similarity metric such as the correlation between HRTF set m and the listener's HRTFs $h'_{\{l,r\},i}$:

$$a_m \sim \left|\sum_{i,\{l,r\}} h'_{\{l,r\},i} - h^*_{\{l,r\},m,i}\right|$$

Embodiment Using a Limited Set of HRTF Basis Functions

Instead of using canonical HRTFs, a population of HRTFs may be decomposed into a set of fixed basis functions, and a user-dependent set of weights to reconstruct a particular HRTF set. This concept is not novel per se and has been described in literature. One method to compute such orthogonal basis functions is to use principal component analysis (PCA) as discussed in the article Modeling of Individual HRTFs based on Spatial Principal Component Analysis, by Zhang, Mengfan & Ge, Zhongshu & Liu, Tiejun & Wu, Xihong & Qu, Tianshu. (2019).

The application of such basis functions in the context of presentation transformation is novel and can obtain a high accuracy for personalization with a limited number of presentation transformation data sets.

As an exemplary embodiment, an individualized HRTF set $h'_{l,i}, h'_{r,i}$ may be constructed by a weighted sum of the HRTF basis functions $b_{l,m,i}, b_{r,m,i}$ with weights $a_m$, for each basis function m:

$$h'_{l,i} = \sum_m a_m b_{l,m,i}$$

$$h'_{r,i} = \sum_m a_m b_{r,m,i}$$

For rendering purposes, a personalized binaural representation is then given by:

$$y'_l = \sum_i x_i[n] \circ h'_{l,i}[n] = \sum_i x_i[n] \circ \sum_m a_m b_{l,m,i}[n]$$

$$y'_r = \sum_i x_i[n] \circ h'_{r,i}[n] = \sum_i x_i[n] \circ \sum_m a_m b_{r,m,i}[n]$$

Reordering summation reveals that this is identical to a weighted sum of contributions generated from each of the basis functions:

$$y_l' = \sum_m a_m \sum_i x_i[n] \circ b_{l,m,i}[n]$$

$$y_r' = \sum_m a_m \sum_i x_i[n] \circ b_{r,m,i}[n]$$

It is noted that the basis function contributions represent binaural information but are not presentations in the sense that they are not intended to be listened to in isolation as they only represent differences between listeners. They may be referred to as binaural difference representations.

Figure 3:
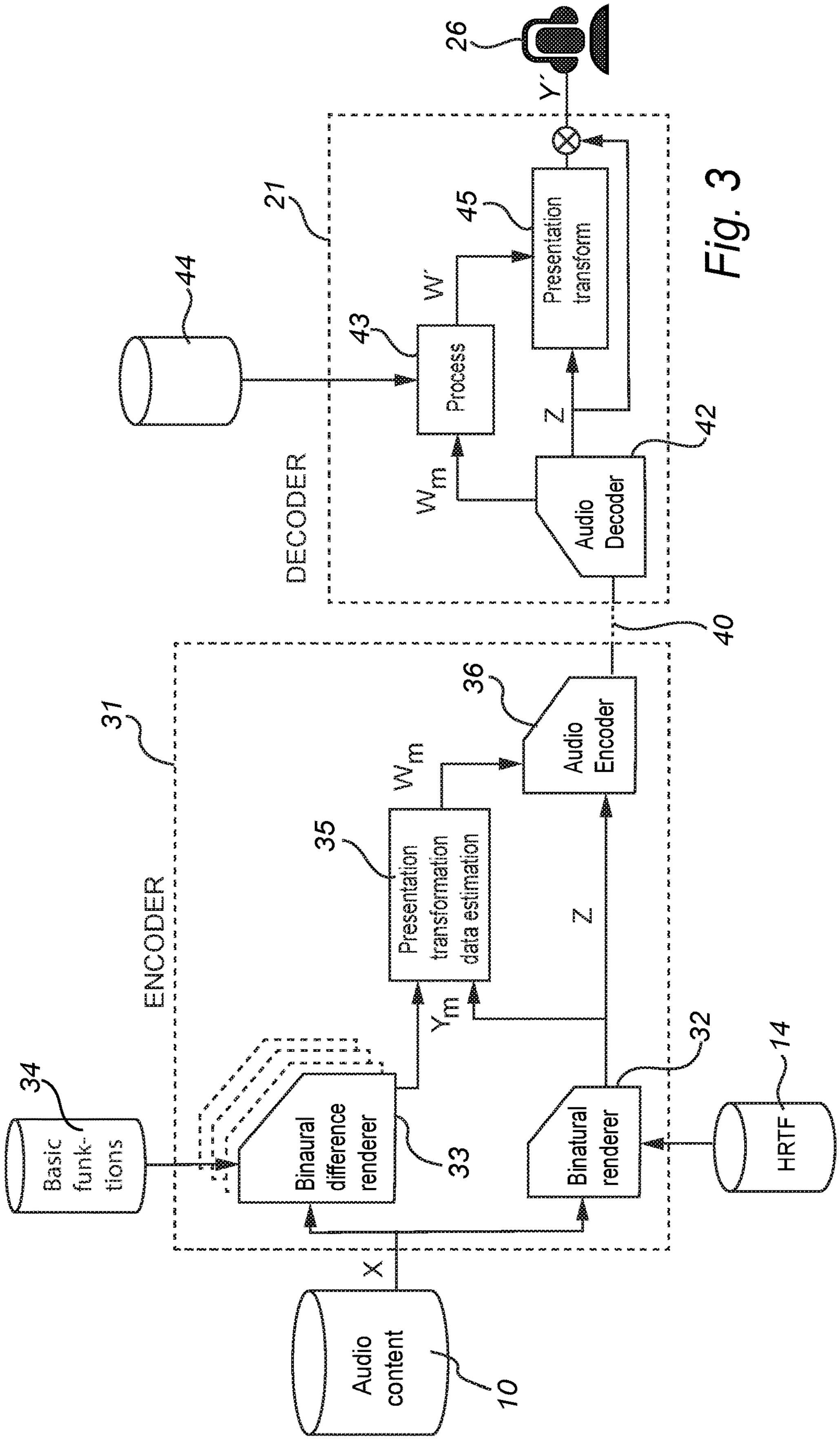
FIG. 3 schematically shows an encoder/decoder system according to a further embodiment of the present invention.

With reference to the encoder/decoder system in FIG. 3, in the encoder 31 a binaural renderer 32 renders a primary (default) binaural presentation Z by applying a selected HRTF set from the database 14 to the input audio 10. In parallel, a renderer 33 renders the various binaural difference representations by applying basis functions from database 34 to the input audio 10, according to:

$$y_{l,m} = \sum_i x_i[n] \circ b_{l,m,i}[n]$$

$$y_{r,m} = \sum_i x_i[n] \circ b_{r,m,i}[n]$$

The m sets of transformation coefficients $W_m$ are calculated by module 35 in the same way as discussed above, by replacing the multiple binaural presentations by the basis function contributions:

$$W_m = (Z^*Z + \epsilon I)^{-1} Z^* Y_m$$

The encoding module 36 will encode the (default) binaural presentation Z, and the m sets of transform parameters $W_m$ to be included in the bitstream 40.

On the decoder side, the transformation parameters can be used to calculate approximations of the binaural difference representations. These can in turn be combined as a weighted sum using weights $a_m$ that vary across individual listeners, to provide a personalized binaural difference $\hat{Y}$:

$$\hat{y}_l' = \sum_m a_m \sum_s w_{s,l,m,i} z_s$$

$$\hat{y}_r' = \sum_m a_m \sum_s w_{s,r,m,i} z_s$$

Or, even simpler, the same combination technique may be applied to the presentation transformation coefficients:

$$\hat{y}_l' = \sum_s z_s \sum_m a_m w_{s,l,m}$$

$$\hat{y}_r' = \sum_s z_s \sum_m a_m w_{s,r,m}$$

and hence the personalized presentation transformation matrix $\hat{W}'$ for generating the personalized binaural difference is given by:

$$\hat{W}' = \sum_m a_m W_m$$

It is this approach that is illustrated in the decoder 41 in FIG. 3. The bitstream 40 is decoded in the decoding module 42, and the m parameter sets $W_m$ are processed in the processing block 43, using personal profile information 44, to obtain the personalized presentation transform $\hat{W}'$. The transform $\hat{W}'$ is applied to the default binaural presentation in presentation transform module 45 to obtain a personalized binaural difference $Z\hat{W}'$. Similar to above, the transform $\hat{W}'$ may be a linear gain 2×2 matrix.

The personalized binaural presentation Y' is finally obtained by adding this binaural difference to the default binaural presentation Z, according to:

$$Y' = Z + Z\hat{W}'.$$

Another way to describe this is to define a total personalization transform W' according to:

$$W' = 1 + \hat{W}'.$$

In a similar but alternative approach, a first set of presentation transformation data $\overline{W}$ may transform a first playback presentation Z intended for loudspeaker playback into a binaural presentation, in which the binaural presentation is a default binaural presentation without personalization.

In this case, the bitstream 40 will include a stereo playback presentation, the presentation transform parameters $\overline{W}$, and the m sets of transform parameters $W_m$ representing binaural differences as discussed above. In the decoder, a default (primary) binaural presentation is obtained by applying the first set of presentation transformation parameters $\overline{W}$ to the playback presentation Z. A personalized binaural difference is obtained in the same way as described with reference to FIG. 3, and this personalized binaural difference is added to the default binaural presentation. In this case, the total transform matrix W' becomes:

$$W' = \overline{W} + \hat{W}'$$

Selection and Efficient Coding of Multiple Presentation Transform Data Sets

The presentation transform data $W_m$ is typically computed for a range of presentations or basis functions, and as a function of time and frequency. Without further data reduction techniques, the resulting data rate associated with the transform data can be substantial.

One technique that is applied frequently is to employ differential coding. If transformation data sets have a lower entropy when computing differential values, either across time, frequency, or transformation set m, a significant reduction in bit rate can be achieved. Such differential coding can be applied dynamically, in the sense that for every frame, a choice can be made to apply time, frequency, and/or presentation-differential entropy coding, based on a bit rate minimization constraint.

Another method to reduce the transmission bit rate of presentation transformation metadata is to have a number of presentation transformation sets that varies with frequency. For example, PCA analysis of HRTFs revealed that individual HRTFs can be reconstructed accurately with a small number of basis functions at low frequencies, and require a larger number of basis functions at higher frequencies.

In addition, an encoder can choose to transmit or discard a specific set of presentation transformation data dynamically, e.g. as a function of time and frequency. For example, some of the basis function presentation may have a very low signal energy in a specific frame or frequency range, depending on the content that is being processed.

One intuitive example of why certain basis presentation signals may have low energy is a scene with one object active that is in front of the listener. For such content, any basis function representative of the size of the listener's head will contribute very little to the overall presentation, as for such content, the binaural rendering is very similar across listeners. Hence in this simple case, an encoder may choose to discard the basis function presentation transformation data that represents such population differences.

More generally, for basis function presentations $y_{l,m}$, $y_{r,m}$ rendered as:

$$y_{l,m} = \sum_i x_i[n] \circ b_{l,m,i}[n]$$

$$y_{r,m} = \sum_i x_i[n] \circ b_{r,m,i}[n]$$

one could compute the energy of each basis function presentation $\sigma_m^2$:

$$\sigma_m^2 = \langle y_{l,m}^2 \rangle + \langle y_{r,m}^2 \rangle$$

with $\langle \bullet \rangle$ the expected value operator, and subsequently discard the associated basis function presentation transformation data $W_m$ if the corresponding energy $\sigma_m^2$ is below a certain threshold. This threshold may for example be an absolute energy threshold, a relative energy threshold (relative to other basis function presentation energies) or may be based on an auditory masking curve estimated for the rendered scene.

Final Remarks

As described in WO 2017/035281, the above process is typically employed as a function of time and frequency. For that purpose, a separate set of presentation transform coefficients $W_m$ is typically calculated and transmitted for a number of frequency bands and time frames. Suitable transforms or filterbanks to provide the required segmentation in time and frequency include the discrete Fourier transform (DFT), quadrature mirror filter banks (QMFs), auditory filter banks, wavelet transforms, and alike. In the case of a DFT, the sample index n may represent the DFT bin index. Without loss of generality and for simplicity of notation time and frequency indices are omitted throughout this document.

When presentation transformation data is generated and transmitted for two or more frequency bands, the number of sets may vary across bands. For example, at low frequencies, one may only transmit 2 or 3 presentation transformation data sets. At higher frequencies, on the other hand, the number of presentation transformation data sets can be substantially higher, due to the fact that HRTF data typically show substantially more variance across subjects at high frequencies (e.g. above 4 kHz) than at low frequencies (e.g. below 1 kHz).

In addition, the number of presentation transformation data sets may vary across time. There may be frames or sub-bands for which the binaural signal is virtually identical across listeners, and hence one set of transformation parameters will suffice. In other frames, of potentially more complex nature, a larger number of presentation transformation data sets is required to provide coverage of all possible HRTFs of all users.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. For example, in the illustrated embodiments, the endpoint device is illustrated as a pair of on-ear headphones. However, the invention is also applicable for other end-point devices, such as in-ear headphones and hearing aids.

What is claimed is:

1. A method of encoding an input audio content having one or more audio components, wherein each audio component is associated with a spatial location, the method including the steps of:

rendering said input audio content into an audio playback presentation, said audio playback presentation intended for reproduction on an audio reproduction system;

determining a set of M binaural representations by applying M sets of transfer functions to the input audio content, wherein the M sets of transfer functions are based on a collection of individual binaural playback profiles;

computing M sets of transform parameters enabling a transform from said audio playback presentation to M approximations of said M binaural representations, wherein said M sets of transform parameters are determined by minimizing a difference between said M binaural representations and said M approximations, wherein M>1; and encoding said audio playback presentation and said M sets of transform parameters for transmission to a decoder.

2. The method according to claim 1, wherein said M binaural representations are M individual binaural playback presentations intended for reproduction on headphones, said M individual binaural playback presentations corresponding to M individual playback profiles.

3. The method according to claim 1, wherein said M binaural representations are M canonical binaural playback presentations intended for reproduction on headphones, said M canonical binaural playback presentations representing a larger collection of individual playback profiles.

4. The method according to claim 1, wherein said M sets of transfer functions are M sets of head related transfer functions.

5. The method according to claim 1, wherein said audio playback presentation is a primary binaural playback presentation intended to be reproduced on headphones, and wherein said M binaural representations are M signal pairs each representing a difference between said primary binaural playback presentation and a binaural playback presentation corresponding to an individual playback profile.

6. The method according to claim 5, wherein said M signal pairs are rendered by M principal component analysis (PCA) basis functions.

7. The method according to claim 1, wherein said audio playback presentation is intended for a loudspeaker system, and wherein M binaural representations include a primary binaural presentation intended to be reproduced on headphones, and M−1 signal pairs each representing a difference between said primary binaural playback presentation and a binaural playback presentation corresponding to an individual playback profile.

8. The method according to claim 1, wherein the number M of transfer functions sets is different for different frequency bands.

9. The method according to claim 1, wherein the step of applying the personalized set of transform parameters to the audio playback presentation is performed by applying a linear gain N×2 matrix to the audio playback presentation, where N is the number of channels in the audio playback presentation, and the elements of the matrix are formed by the transform parameters.

10. A non-transitory computer-readable medium storing computer program code portions configured to perform the steps of claim 1 when executed on a processor.

11. A method of decoding a personalized binaural playback presentation from an audio bitstream, the method including the steps of:

receiving and decoding an audio playback presentation, said audio playback presentation intended for reproduction on an audio reproduction system;

receiving and decoding M sets of transform parameters enabling a transform from said audio playback presentation to M approximations of M binaural representations, wherein said M sets of transform parameters have been determined by an encoder to minimize a difference between said M binaural representations and said M approximations generated by application of the transform parameters to the audio playback presentation, wherein M>1;

combining said M sets of transform parameters into a personalized set of transform parameters; and applying the personalized set of transform parameters to the audio playback presentation, to generate said personalized binaural playback presentation.

12. The method according to claim 11, wherein the step of combining said M sets of transform parameters includes selecting a personalized set as one of the M sets.

13. The method according to claim 11, wherein the step of combining said M sets of transform parameters includes forming a personalized set as a linear combination of the M sets.

14. The method according to claim 11, wherein said audio playback presentation is a primary binaural playback presentation intended to be reproduced on headphones, and wherein said M sets of transform parameters enabling a transform from said audio playback presentation into M signal pairs each representing a difference between said primary binaural playback presentation and a binaural playback presentation corresponding to an individual playback profile, and wherein the step of applying the personalized set of transform parameters to the primary binaural playback presentation includes:

forming a personalized binaural difference by applying the personalized set of transform parameters as a linear gain 2×2 matrix to the primary binaural playback presentation, and summing said personalized binaural difference and the primary binaural playback presentation.

15. The method according to claim 11, wherein said audio playback presentation is intended to be reproduced on loudspeakers, and wherein a first set of said M sets of transform parameters enables a transform from said audio playback presentation into an approximation of a primary binaural presentation, and remaining sets of transform parameters enable a transform from said audio playback presentation into M−1 signal pairs each representing a difference between said primary binaural playback presentation and a binaural playback presentation corresponding to an individual playback profile, and wherein the step of applying the personalized set of transform parameters to the primary binaural playback presentation includes:

forming a primary binaural presentation by applying the first set of transform parameters to the audio playback presentation, forming a personalized binaural difference by applying the personalized set of transform parameters as a linear gain 2×2 matrix to said primary binaural playback presentation, and summing said personalized binaural difference and the primary binaural playback presentation.

16. The method according to claim 15, wherein the step of applying the first set of transform parameters to the audio playback presentation is performed by applying a linear gain N×2 matrix to the audio playback presentation, where N is the number of channels in the audio playback presentation and the elements of the matrix are formed by the transform parameters.

17. A non-transitory computer-readable medium storing computer program product including computer program code portions configured to perform the steps of claim 11 when executed on a processor.

18. An encoder for encoding an input audio content having one or more audio components, wherein each audio component is associated with a spatial location, the encoder comprising:

a first renderer for rendering said input audio content into an audio playback presentation, said audio playback presentation intended for reproduction on an audio reproduction system;

a second renderer for determining a set of M binaural representations by applying M sets of transfer functions to the input audio content, wherein the M sets of transfer functions are based on a collection of individual binaural playback profiles;

a parameter estimation module for computing M sets of transform parameters enabling a transform from said audio playback presentation to M approximations of said M binaural representations, wherein said M sets of transform parameters are determined by minimizing a difference between said M binaural representations and said M approximations, wherein M>1; and an encoding module for encoding said audio playback presentation and said M sets of transform parameters for transmission to a decoder.

19. The encoder according to claim 18, wherein said second renderer is configured to render M individual binaural playback presentations intended for reproduction on headphones, said M individual binaural playback presentations corresponding to M individual playback profiles.

20. The encoder according to claim 18, wherein said second renderer is configured to render M canonical binaural playback presentations intended for reproduction on headphones, said M canonical binaural playback presentations representing a larger collection of individual playback profiles.

21. The encoder according to claim 18, wherein said first renderer is configured to render a primary binaural playback presentation intended to be reproduced on headphones, and wherein said second renderer is configured to render M signal pairs each representing a difference between said primary binaural playback presentation and a binaural playback presentation corresponding to an individual playback profile.

22. The encoder according to claim 18, wherein said first renderer I configured to render an audio playback presentation intended for a loudspeaker system, and wherein said second renderer is configured to render a primary binaural presentation intended to be reproduced on headphones, and M−1 signal pairs each representing a difference between said primary binaural playback presentation and a binaural playback presentation corresponding to an individual playback profile.

23. A decoder for decoding a personalized binaural playback presentation from an audio bitstream, the decoder comprising:

a decoding module for receiving said audio bitstream and decoding an audio playback presentation intended for reproduction on an audio reproduction system and M sets of transform parameters enabling a transform from said audio playback presentation to M approximations of M binaural representations, wherein M>1, wherein said M sets of transform parameters have been determined by minimizing a difference between said M binaural representations and said M approximations generated by application of the transform parameters to the audio playback presentation;

a processing module for combining said M sets of transform parameters into a personalized set of transform parameters; and a presentation transformation module for applying the personalized set of transform parameters to the audio playback presentation, to generate said personalized binaural playback presentation.

24. The decoder according to claim 23, wherein said processing module is configured to select one of the M sets as said personalized.

25. The decoder according to claim 23, wherein said processing module is configured to form a personalized set as a linear combination of the M sets.

26. The decoder according to claim 23, wherein said audio playback presentation is a primary binaural playback presentation intended to be reproduced on headphones, and wherein said M sets of transform parameters enabling a transform from said audio playback presentation into M signal pairs each representing a difference between said primary binaural playback presentation and a binaural playback presentation corresponding to an individual playback profile, and wherein said presentation transformation module is configured to:

form a personalized binaural difference by applying the personalized set of transform parameters as a linear gain 2×2 matrix to the primary binaural playback presentation, and sum said personalized binaural difference and said primary binaural playback presentation.

27. The decoder according to claim 23, wherein said audio playback presentation is intended to be reproduced on loudspeakers, and wherein a first set of said M sets of transform parameters enables a transform from said audio playback presentation into an approximation of a primary binaural presentation, and remaining sets of transform parameters enable a transform from said audio playback presentation into M−1 signal pairs each representing a difference between said primary binaural playback presentation and a binaural playback presentation corresponding to an individual playback profile, and wherein said presentation transformation module is configured to:

form a primary binaural presentation by applying the first set of transform parameters to the audio playback presentation, form a personalized binaural difference by applying the personalized set of transform parameters as a linear gain 2×2 matrix to said primary binaural playback presentation, and sum said personalized binaural difference and the primary binaural playback presentation.

* * * * *